United States Patent [19]

Tenma

[11] Patent Number: 4,974,074
[45] Date of Patent: Nov. 27, 1990

[54] VIDEO SIGNAL PROCESSING APPARATUS FOR A STEREOSCOPIC VIDEO IMAGE

[75] Inventor: Tetsuya Tenma, Saitama, Japan
[73] Assignee: Pioneer Electronic Corporation, Tokyo, Japan
[21] Appl. No.: 377,689
[22] Filed: Jul. 10, 1989
[30] Foreign Application Priority Data
  Jan. 30, 1989 [JP] Japan .................................. 1-20998
[51] Int. Cl.⁵ ............................................ H04N 13/00
[52] U.S. Cl. ........................................ 358/92; 358/88
[58] Field of Search ...................... 358/11, 88, 92, 134, 358/140, 93

[56] References Cited

U.S. PATENT DOCUMENTS 4,322,750 3/1982 Lord et al. .
4,562,463 12/1985 Lipton .................................... 358/88
4,683,497 7/1987 Mehrgardt .......................... 358/166
4,873,572 10/1989 Miyazaki et al. .................... 358/88

FOREIGN PATENT DOCUMENTS 53-79421 7/1978 Japan .

Primary Examiner—James J. Groody
Assistant Examiner—Kim Yen Vu
Attorney, Agent, or Firm—Sughrue, Mion, Zinn, Macpeak & Seas

[57] ABSTRACT

A video signal processing circuit processes a digital video signal to provide a stereoscopic video signal which can be presented without flicker and without reduced recording time. Digital video fields are consecutively stored in three memories or storage location of a memory, each new field replacing the oldest one. The fields are stored at a first clock rate. The stored video is read out at twice the first rate with each successive pair of fields being read out twice.

10 Claims, 2 Drawing Sheets

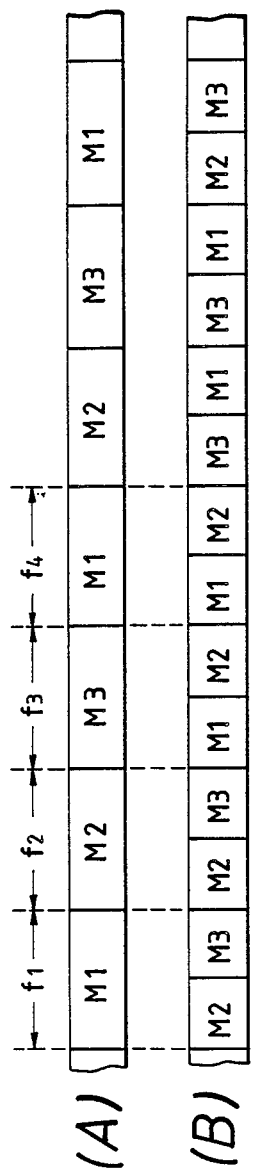

VIDEO SIGNAL PROCESSING APPARATUS FOR A STEREOSCOPIC VIDEO IMAGE

BACKGROUND OF THE INVENTION

The present invention relates to an apparatus for processing a video signal.

In a conventional stereoscopic video system for recording and reproducing a video signal, the video signal for the left eye according to a picture image seen and provided by only the left eye and the video signal for a right eye according to a picture image seen and provided by only the right eye are alternately recorded on a recording medium on an alternating field basis. Further, in reproduction, the video signals for the left and right eyes are alternately provided on the same field by field basis, and a stereoscopic image can be sensed by using a pair of glasses with two shutters for alternately shielding the fields for the left and right eyes.

In such a conventional system, the switching frequency for opening and closing the two shutters in the glasses is about 60 Hz, and this causes flicker. Therefore, the video signal is compressed by 50% with respect to the time axis and the horizontal synchronization frequency is set to 31.5 KHz and the vertical synchronization frequency is set to 120 Hz. The video signal is recorded onto and reproduced from a video disk, and the switching frequency of the two shutters in the glasses is set to 120 Hz so as to provide a stereoscopic picture image with no flicker.

However, when this system is used, the number of rotations of the video disk must be twice that of a disk having a non-compressed video signal, thereby shortening the recording and reproducing time of the recording medium.

SUMMARY OF THE INVENTION

To solve the conventional problems mentioned above, an object of the present invention is to provide a video signal processing apparatus for providing a stereoscopic picture image by compressing a video signal read from the recording medium with respect to the time axis, wherein the stereoscopic image is produced without flicker and the recording/reproducing time of the medium is not shortened.

With the above object in mind, the present invention resides in a video signal processing apparatus comprising first clock generating means for generating a first clock signal having a predetermined frequency; second clock generating means for generating a second clock signal having a frequency which is an integral times said predetermined frequency where said integer is not less than two; analog-digital converting means for producing digital data according to a sampling value provided by sampling an input video signal by said first clock signal in a predetermined period; memories for at least three fields for supplying said digital data thereto; and memory control means for controlling said memories for at least three fields such that said digital data are sequentially written by said first clock signal to the respective fields of said memories for at least three fields, every data group corresponding to one field, and two data groups corresponding to two fields constituting one frame are respectively written to the two fields of said memories for at least three fields, and the two data groups corresponding to the respective two fields constituting a frame located by one before said one frame are sequentially read out repeatedly an integral number of times by said second clock signal.

BRIEF DESCRIPTION OF THE DRAWINGS

The present invention will be more apparent from the following description of the preferred embodiments thereof in conjunction with the accompanying drawings in which:

FIG. 2 is a format diagram helpful in explaining the operation of the video signal processing apparatus of FIG. 1.

DESCRIPTION OF THE PREFERRED EMBODIMENTS

Figure 1:
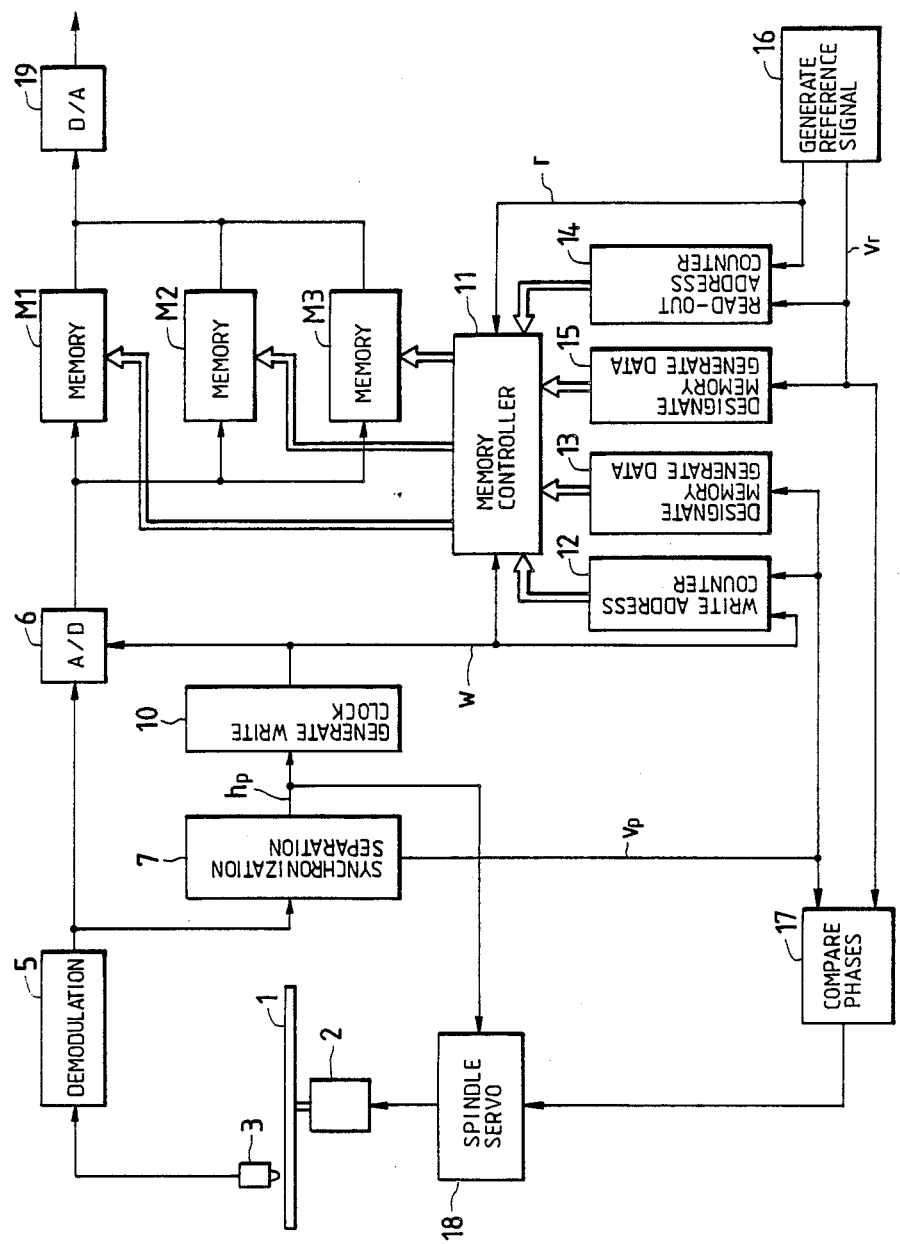
FIG. 1 is a block diagram showing a video signal processing apparatus in one embodiment of the present invention.

The preferred embodiments of a video signal processing apparatus according to the present invention will now be described in detail with reference to the accompanying drawings.

In FIG. 1, disk 1 is rotated by a spindle motor 2. A signal recorded onto disk 1 is read by a pickup 3 according to the rotation of disk 1. A read signal outputted from pickup 3, i.e., a so-called RF signal, is supplied to demodulating circuit 5 composed of an FM-demodulator, etc. The video signal is demodulated by this demodulating circuit 5 and is supplied to an A/D (analog/digital) converter 6 and a synchronization separating circuit 7. In the synchronization separating circuit 7, horizontal and vertical synchronization signals are separated from the video signal and are respectively outputted as reproducing horizontal synchronization signal hp and reproducing vertical synchronization signal vp. Reproducing horizontal synchronization signal hp is supplied to a write-clock generating circuit 10. Write-clock generating circuit 10 is composed of a phase-locked loop circuit, for example, and is constructed to generate write clock signal w having a frequency ($4f_{sc}$) four times a color sub-carrier frequency and synchronized with reproducing horizontal synchronization signal hp. Write clock signal w is supplied to a memory controller 11 and a write address counter 12 and is further supplied to the A/D converter 6 as a sampling pulse.

In A/D converter 6, the video signal is sampled by write clock signal w to provide digital data according to a sampling value provided by the sampling operation. Output data of A/D converter 6 is supplied to memories M1, M2 and M3. Memories M1, M2 and M3 have memory capacities which can store data corresponding to the video signal in one field period, for example, and are controlled by memory controller 11.

Write address counter 12 counts up in response to write clock pulses w, for example, and is composed of a binary counter reset by reproducing vertical synchronization signal vp from synchronization separating circuit 7. An output of the write address counter 12 is supplied to memory controller 11. Reproducing vertical synchronization signal vp outputted from synchronization separating circuit 7 is supplied to a memory designating data generating circuit 13. Memory designating data generating circuit 13 is composed of a ternary counter which counts the reproducing vertical synchronization pulses vp, for example. An output of the memory designating data generating circuit 13 is supplied to the memory controller 11.

Outputs of a read-out address counter 14 and a memory designating data generating circuit 15 are further supplied to the memory controller 11. A read-out clock signal r and a reference vertical synchronization signal vr outputted from a reference signal generating circuit 16 are supplied to the read-out address counter 14. Reference signal generating circuit 16 is composed of a crystal oscillator for generating read-out clock signal r having a frequency ($8f_{sc}$) twice the frequency of write clock signal w, for example, and a frequency divider for producing reference vertical synchronization signal vr by dividing the frequency of this read-out clock signal r. Read-out address counter 14 counts up in response to read-out clock pulses r, for example, and is composed of a binary counter reset by the reference vertical synchronization signal vr. Memory designating data generating circuit 15 is composed of a duodecimal counter which counts the reference vertical synchronization pulses Vr and a ROM for generating three data respectively corresponding to memories M1 to M3 in accordance with an output of the duodecimal counter. The output therefrom is an address input to the controller.

Reference vertical synchronization signal vr is supplied to a phase comparing circuit 17, which compares the phase of signal vr with that of reproducing vertical synchronization signal vp. Phase comparing circuit 17 produces a signal according to the difference in phase between the reference vertical synchronization signal and the reproducing vertical synchronization signal, and this signal is supplied to a spindle servo circuit 18. Spindle servo circuit 18 is constructed to supply to spindle motor 2 a signal according to the difference in phase between reproducing horizontal synchronization signal h and a reference horizontal synchronization signal from an unillustrated reference signal generating circuit and in accordance with a drive signal corresponding to the output of phase comparing circuit 17. Spindle servo circuit 18 controls the rotary speed of spindle motor 2 such that the phase difference between the reference horizontal synchronization signal and the reproducing horizontal synchronization signal will be zero and further the phase difference between the reference vertical synchronization signal and the reproducing vertical synchronization signal will be zero.

The memory controller 11 responds to the address data from write address counter 12, the memory designation data from circuit 13, and the clock pulses w, to cause the digital video from A/D converter 6 to be written into the memory M1–M3 selected by the circuit 13 at an address therein determined by the write address counter 12. In a like manner, controller 11 causes readout of data from the memory in accordance with the memory designating data generating circuit 15, which selects the memory M1–M3, and the read-out address counter 14, which selects the address within the selected memory, and the clock signal r, which determines the read-out data rate.

The data read out of memories M1 to M3 are supplied to a D/A converter 19 and are then converted to an analog signal. A reproduced video signal is outputted from this D/A converter 19.

The memory designated by the output of memory designating data generating circuit 13 constructed above is changed every field, as shown in FIG. 2(A), for example. The memory designated by the output of memory designating data generating circuit 15 is changed every one half field, as shown in FIG. 2(B), for example. At this time, the video signal for left eye is assumed to be read out of the disk in the $f_1$th field, and the video signal for right eye is assumed to be read out of the disk in the $f_2$th field subsequent to the $f_1$th field. Similarly, the video signals for left and right eyes are assumed to be alternately read out of the disk in every other field. Thus, the data corresponding to the video signal for the left eye is written to memory M1 by write clock signal w having frequency $4f_{sc}$ in the $f_1$th field. Thereafter, in the subsequent $f_2$th field, the data corresponding to the video signal for the right eye is then written to memory M2. In the $f_3$th field, the data corresponding to the video signal for left eye is written to memory M3. In addition, in the first half of the $f_3$th field, the data written to memory M1 and corresponding to the video signal for left eye is sequentially read out by read-out clock signal r having frequency $8f_{sc}$. In the latter half of the $f_3$th field, the data written to memory M2 and corresponding to the video signal for the right eye is sequentially read out.

In the $f_4$th field, the data corresponding to the video signal for right eye is written to memory M1 by write clock signal w having frequency $4f_{sc}$. In addition, in the first half of this $f_4$th field, the data written to memory M1 and corresponding to the video signal for left eye is sequentially read out again by read-out clock signal r having frequency $8f_{sc}$. In the latter half of the $f_4$th field, the data written to memory M2 and corresponding to the video signal for right eye is sequentially read out again. In the first half of this $f_4$th field, as mentioned above, the write operation and the read-out operation are performed with respect to memory M1, but the frequency of read-out clock signal r is twice the frequency of write clock signal w. Therefore, the data read out of memory M1 will be the data previously written into M1 during the $f_1$th field and corresponding to the video signal for left eye.

Accordingly, in the $f_3$th and $f_4$th fields, the video signals for left and right eyes read out of the disk in the $f_1$th and $f_2$th fields are repeatedly reproduced twice, and the horizontal synchronization frequency becomes 31.5 KHz an the vertical synchronization frequency becomes 120 Hz. Similarly, in the other continuous two fields, the video signals for left and right eyes are repeatedly reproduced twice and the horizontal synchronization frequency becomes 31.5 KHz and the vertical synchronization frequency becomes 120 Hz. Accordingly, a stereoscopic picture image can be obtained by setting the switching frequency of the two shutters in the stereoscopic glasses to 120 Hz, thereby causing no flicker.

In the above-mentioned embodiment, the frequency of the read-out clock signal r is set to be twice the frequency of write clock signal w, but may be set to be any frequency if the frequency of read-out clock signal r is an integer multiple of the frequency of write clock signal w and the integer is two or more. Further, in the above-mentioned embodiment, the frequency of read-out clock signal r is fixed, but it can be switched such that the frequency of read-out clock signal r is equal to the frequency of write clock signal w so as to reproduce a normal video signal except for the video signal for a stereoscopic picture image.

As can be seen from FIG. 2, the fields M1, etc., are written during write field periods $f_1$, etc. On the other hand, the fields M1 and M2 are read out successively and twice repeatedly during write field periods $f_3$ and $f_4$. The basic concept taught in the specific embodiment can be expanded for an increased number of repetitions and an increased storage capacity.

For example, if K is the number of digital video field storage locations, and m is the integer number of times the read clock exceeds the write clock (i.e., (read clock)=(m) x (write clock)), $F_n$ is the nth digital video field and n is the write field period; it can be seen that:

the fields $F_n$, $F_{n+1}$ ... are written during periods n, n+1 in K successive storage locations or memories at a first clock rate, each field $F_n$ replacing a field $F_{n-k}$ written K field periods previously, and each successive group of two successive fields $F_n$ and $F_{n+1}$ are read out of said storage locations at a read clock rate m times said write rate;

the fields $F_n$ and $F_{n+1}$ are read out in succession m times during the write field periods $F_{n+2}$ and $F_{n+3}$.

As mentioned above, in the video signal processing apparatus of the present invention, memories for at least three fields are provided and fields of digital video data are sequentially written into the memories at a first clock rate. Two data groups corresponding to two fields constituting one frame are respectively written into two memories. The two data groups corresponding to the respective two fields constituting a frame are sequentially read out repeatedly N times (N is an integer not less than two) by a second clock signal having a frequency N times that of the first clock signal. The memories for the three fields are controlled to provide the above construction. Accordingly, in the video signal processing apparatus of the present invention, the video signal is read out of the recording medium on which the video signals for left and right eyes are alternately recorded in every other field, and this read video signal can be compressed N times with respect to time. Thus, the apparatus can provide a stereoscopic picture image with no flicker without shortening the recordable time of the recording medium.

What is claimed is:

1. A video signal processing means for processing a video signal divided into fields of digital video data, comprising:

memory means for storing K consecutive fields of digital video data in K successive field storage locations thereof;

write control means for writing successive fields of video digital data at a first clock rate into said successive field storage locations on a continuing basis during the occurrence of successive write field periods, each said written field of digital video data replacing the one previously written in said memory means K fields ago; and read-out control means for reading out said video digital data from said field storage locations at a second clock rate which is an integer m times said first clock rate in accordance with the following sequence;

fields $F_n$ and $F_{n+1}$, written during write field periods N and N+1 respectively, are read out successively and m times repeatedly during write field periods N+2 and N+3, each successive group of two successive fields being read out in sequence;

where K is at least 3 and m is an integer equal to or greater than 2.

2. A video signal processing means as claimed in claim 1, wherein said write control means comprises:

write clock generator means for generating a write clock in synchronism with a synchronization signal in said video signal;

write address counter responsive to said write clock signal for providing a write address;

memory designation counter responsive to field synchronization signals in said video signal for generating a write storage location address; and memory controller responsive to said write clock signals, said write address and said write storage location address for controlling the writing of said digital video data in said memory means.

3. A video signal processing means as claimed in claim 2, wherein said write control means comprises:

a read clock generator means for generating a read clock signal;

read address counter responsive to said read clock signal for providing a read address;

second memory designation counter responsive to an output from said read clock generator for generating a read storage location address; and said memory controller; said memory controller further being responsive to said read clock signals, said read address and said read storage location address for controlling the reading of said digital video data from said memory.

4. A video signal processing means as claimed in any of claims 1–3, wherein K equals 3.

5. A video signal processing means as claimed in claim 4, wherein m=2.

6. A video signal processing apparatus for developing a stereoscopic video signal from a video signal stored on a recording disk, comprising:

disk read out means for reading a video signal having an alternating field formed from a recording disk;

analog to digital converter means for converting said read out video signal into consecutive fields of digital data;

memory means for storing K consecutive fields of digital video data in K successive field storage locations thereof;

write control means for writing successive fields of video digital data at a first clock rate into said successive field storage locations on a continuing basis during the occurrence of successive write field periods, each said written field of digital video data replacing the one previously written in said memory means K fields ago; and read-out control means for reading out said video digital data from said field storage locations at a second clock rate which is an integer M times said first clock rate in accordance with the following sequence;

fields $F_n$ and $F_{n+1}$, written during write field periods N and N+1 respectively, are read out successively and m times repeatedly during write field periods N+2 and N+3, each successive group of two successive fields being read out in sequence;

where K is at least 3 and m is an integer equal to or greater than 2.

7. A video signal processing apparatus as claimed in claim 6, wherein said write control means comprises:

write clock generator means for generating a write clock in synchronism with a synchronization signal in said video signal;

write address counter responsive to said write clock signal for providing a write address;

memory designation counter responsive to field synchronization signals in said video signal for generating a write storage location address; and memory controller responsive to said write clock signals, said write address and said write storage location address for controlling the writing of said digital video data in said memory means.

8. A video signal processing apparatus as claimed in claim 7, wherein said write control means comprises:

a read clock generator means for generating a read clock signals;

read address counter responsive to said read clock signal for providing a read address;

second memory designation counter responsive to an output from said read clock generator for generating a read storage location address; and said memory controller; said memory controller further being responsive to said read clock signals, said read address and said read storage location address for controlling the reading of said digital video data from said memory.

9. A video signal processing apparatus as claimed in any of claims 6–8, wherein K=3.

10. A video signal processing apparatus as claimed in claim 9, wherein M=2.

* * * * *